United States Patent
Remacha et al.

(10) Patent No.: US 10,584,211 B2
(45) Date of Patent: Mar. 10, 2020

(54) METHOD FOR REDUCING YELLOWNESS INDEX OF A POLYETHERIMIDE, POLYETHERIMIDE HAVING A REDUCED YELLOWNESS INDEX, AND COMPOSITIONS AND ARTICLES COMPRISING THE POLYETHERIMIDE

(71) Applicant: SABIC Global Technologies B.V., Bergen op Zoom (NL)

(72) Inventors: Javier Nieves Remacha, Cartagena (ES); Juan Justino Rodriguez Ordonez, Cartagena (ES); Bernabe Quevedo Sanchez, Cartagena (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/078,672

(22) PCT Filed: Feb. 28, 2017

(86) PCT No.: PCT/IB2017/051171
§ 371 (c)(1),
(2) Date: Aug. 22, 2018

(87) PCT Pub. No.: WO2017/149456
PCT Pub. Date: Sep. 8, 2017

(65) Prior Publication Data
US 2019/0048142 A1 Feb. 14, 2019

(30) Foreign Application Priority Data
Feb. 29, 2016 (EP) .................... 16382086

(51) Int. Cl.
| | | |
|---|---|---|
| C08F 2/46 | (2006.01) | |
| C08F 2/50 | (2006.01) | |
| C08G 61/04 | (2006.01) | |
| C08G 73/10 | (2006.01) | |
| C08J 3/28 | (2006.01) | |
| C08L 79/08 | (2006.01) | |
| C08J 3/11 | (2006.01) | |

(52) U.S. Cl.
CPC ......... C08G 73/1053 (2013.01); C08G 73/10 (2013.01); C08G 73/1046 (2013.01); C08J 3/11 (2013.01); C08J 3/28 (2013.01); C08L 79/08 (2013.01); C08J 2379/08 (2013.01)

(58) Field of Classification Search
CPC ............. C08G 73/1053; C08G 73/1046; C08G 73/10; C08L 79/08; C08J 3/28; C08J 2379/08; C08J 3/11
USPC .................. 522/164, 162, 1; 520/1
See application file for complete search history.

(56) References Cited

U.S. PATENT DOCUMENTS

| | | | |
|---|---|---|---|
| 2002/0151675 A1 | 10/2002 | Johnson et al. | |
| 2007/0078216 A1* | 4/2007 | Cao | C08K 5/0041 524/497 |
| 2009/0292128 A1* | 11/2009 | Guggenheim | C07D 209/48 548/480 |
| 2016/0053117 A1* | 2/2016 | Nair | C08L 79/08 525/425 |

FOREIGN PATENT DOCUMENTS

| | | |
|---|---|---|
| WO | 2015160933 A1 | 4/2015 |
| WO | 2016138388 | 9/2016 |
| WO | 2016138391 A1 | 9/2016 |
| WO | 2016196268 A1 | 12/2016 |

OTHER PUBLICATIONS

International Search Report for International Application No. PCT/IB2017/051171; International Filing Date: Feb. 28, 2017; dated May 12, 2017; 6 pages.
Written Opinion of the International Searching Authority for International Application No. PCT/IB2017/051171; International Filing Date: Feb. 28, 2017; dated May 12, 2017; 8 pages.

* cited by examiner

*Primary Examiner* — Jessica Whiteley
(74) *Attorney, Agent, or Firm* — Cantor Colburn LLP

(57) ABSTRACT

A method for reducing yellowness of a polyetherimide solution, including exposing a first solution including a solvent and a polyetherimide to light under conditions effective to provide a second solution having a yellowness index that is 1 to 100 units less than the yellowness index of the first solution, as determined according to ASTM D1925. Another aspect is a method for reducing yellowness of a polyetherimide solution including acidifying a first solution including a solvent and a polyetherimide to provide a second solution having a pH less than 5 under conditions effective for the second solution to attain a yellowness index that is 1 to 30 units less than the yellowness index of the first solution, as determined according to ASTM D1925. Polyetherimides prepared according to the method, and compositions and articles including the polyetherimide are also described.

18 Claims, No Drawings

METHOD FOR REDUCING YELLOWNESS INDEX OF A POLYETHERIMIDE, POLYETHERIMIDE HAVING A REDUCED YELLOWNESS INDEX, AND COMPOSITIONS AND ARTICLES COMPRISING THE POLYETHERIMIDE

CROSS-REFERENCE TO RELATED APPLICATIONS

This application is a National Stage application of PCT/IB2017/051171 filed Feb. 28, 2017, which claims priority to European Application No. 16382086.3, filed Feb. 29, 2016 both of which are incorporated by reference herein in their entirety.

BACKGROUND

Polyetherimides ("PEIs") are amorphous, transparent, high performance polymers having a glass transition temperature ("Tg") of greater than 180° C. Polyetherimides further have high strength, heat resistance, and modulus, and broad chemical resistance, and so are widely used in applications as diverse as automotive, telecommunication, aerospace, electrical/electronics, transportation, and healthcare. Polyetherimides can be manufactured by polycondensation of a dianhydride with an organic diamine (polycondensation).

An ongoing challenge associated with the use of polyetherimides is achieving low color polyetherimide, specifically polyetherimides having a low yellowness index. Lower color polymers have a wider range of commercial uses, for example, including optical applications. Use of lower color polymers also makes it easier to perform color matching applications. Furthermore, many customers prefer lower color polymers, because it enables them to make more transparent parts and develop a wide array of products that meet customer expectations.

Accordingly, there remains a continuing need in the art for a method to reduce the color (e.g., yellowness) of polyetherimides in order to meet the product demands of many applications.

BRIEF DESCRIPTION

A method of reducing yellowness of a polyetherimide solution comprises exposing a first solution comprising a solvent and a polyetherimide to light under conditions effective to provide a second solution having a yellowness index that is 1 to 100, preferably 10 to 90, more preferably 20 to 80, even more preferably 40 to 75 units less than the yellowness index of the first solution, as determined according to ASTM D1925.

A method of reducing yellowness of a polyetherimide solution comprises acidifying a first solution comprising a solvent and a polyetherimide to provide a second solution having a pH less than 5, preferably less than 3, more preferably less than 2.5 under conditions effective for the second solution to attain a yellowness index that is 1 to 30, preferably 2 to 25, more preferably 5 to 20 units less than the yellowness index of the first solution, as determined according to ASTM D1925.

A polyetherimide having a reduced yellowness index made from the method is also described.

A composition and an article comprising the polyetherimide are also described.

The above described and other features are exemplified by the following detailed description.

DETAILED DESCRIPTION

Described herein is a method for reducing the yellowness index of a polyetherimide. The present inventors have unexpectedly found that lower color can be achieved through addition of an acid or exposure to light (e.g., sunlight). Advantageously, the method disclosed herein provided polyetherimides having a reduced yellowness index, for example a yellowness index of less than or equal to 95, determined according to ASTM D1925. The polyetherimides having reduced color are particularly useful for compositions and articles in various applications where low color is desirable.

Accordingly, one aspect of this disclosure is a method of reducing yellowness of a polyetherimide solution. The polyetherimide solution can be prepared by any method that is generally known, for example by dissolving pelleted polyetherimide in a solvent. Alternatively, the polyetherimide solution can be obtained as a product stream directly from a process for preparing the polyetherimide, for example prior to polymer isolation.

In an embodiment, the method comprises exposing a first solution comprising a solvent and a polyetherimide to light under conditions effective to provide a second solution having a reduced yellowness index. In some embodiments, the conditions effective to provide the second solution can include a temperature of 10 to 200° C., or 15 to 35° C., or 10 to 25° C., and a time of 1 minutes to 72 hours, for example 10 minutes to 120 minutes. In some embodiments, the light has a wavelength of 100 nanometers to 1 millimeter, or 100 to 400 nanometers, or 400 to 800 nanometers, or 700 to 1 millimeter. In some embodiments, the light is sunlight.

In some embodiments, the second solution obtained by this method has a yellowness index that is 1 to 100, preferably 10 to 90, more preferably 20 to 80, even more preferably 40 to 75 units less that the yellowness index of the first solution, as determined according to ASTM D1925.

In another embodiment, the method for reducing the yellowness of a polyetherimide solution comprises acidifying the first solution to provide a second solution having a pH less than 5, preferably less than 3, more preferably less than 2.5 under conditions effective to provide a second solution having a reduced yellowness index. In some embodiments, the conditions effective to provide the second solution can include a temperature of 10 to 200° C., or 15 to 35° C., or 10 to 25° C., and a time of 1 minutes to 72 hours, for example 10 minutes to 120 minutes. For example, the second solution has a yellowness index that is 1 to 30, preferably 2 to 25, more preferably 5 to 20 units less than the yellowness index of the first solution, as determined according to ASTM D1925. In some embodiments, the acidifying comprises combining the first solution with an inorganic acid, for example, phosphoric acid, sulfuric acid, hydrochloric acid, nitric acid, boric acid, hydrofluoric acid, hydrobromic acid, perchloric acid, hydroiodic acid, or a combination comprising at least one of the foregoing inorganic acids. In some embodiments, the inorganic acid can be phosphoric acid, sulfuric acid, hydrochloric acid, or a combination comprising at least one of the foregoing. In some embodiments, the acidifying comprises combining the first solution with an organic acid, for example, benzoic acid, oxalic acid, citric acid, malic acid, maleic acid, formic acid, glutaric acid, succinic acid, fumaric acid, pyruvic acid, stearic acid, ascorbic acid, acetic acid, or a combination comprising at least one of the foregoing. In some embodiments, the organic acid comprises benzoic acid, oxalic acid, or a combination comprising at least one of the foregoing. In some embodiments, a combination of an inorganic and an organic acid can be used.

In some embodiments, after acidifying the first solution to provide the second solution, the method can further comprise exposing the second solution to light (e.g., sunlight) for a predetermined amount of time to provide a third solution. The third solution can have a yellowness index that is 1 to 100, preferably 10 to 90, more preferably 20 to 80, even more preferably 40 to 75 units less than the yellowness index of the first solution, as determined according to ASTM D1925. In some embodiments, the third solution can have a yellowness index that is 1 to 30, preferably 5 to 25, more preferably 10 to 20 units less than the yellowness index of the second solution, as determined according to ASTM D1925.

In other embodiments, after acidifying the first solution to provide the second solution, the method can further comprise adding a base to the second solution to increase the pH to 6 to 12, for example 7 to 9 to provide a fourth solution having a yellowness index that is 110 to 170, preferably 130 to 170, as determined according to ASTM D1925.

The first solution comprises a solvent and a polyetherimide. The solvent can be any solvent that is generally known to solubilize a polyetherimide. For example, the solvent can be benzene, ortho-dichlorobenzene, N-methylpyrrolidone, cresol, chlorobenzene, anisole, toluene, veratrole, dichlorotoluene, 1,2,4-trichlorobenzene, diphenyl sulfone, diphenylether, phenetole, dimethylsulfoxide, dimethylacetamide, dimethylformamide, and the like, or a combination comprising at least one of the foregoing. In some embodiments, the solvent comprises benzene, ortho-dichlorobenzene, or a combination comprising at least one of the foregoing.

The polyetherimide can be generally prepared by any of the methods known to those skilled in the art. In preferred embodiments, the polyetherimide is prepared by the "halo-displacement process." Synthesis of polyetherimide via the halo-displacement route includes the steps of imidization (as described, for example, in U.S. Pat. No. 6,235,866), BPA salt synthesis (as described, for example, in U.S. Pat. No. 4,520,204) and polymerization (as described, for example, in U.S. Pat. No. 6,265,521), followed by various downstream processes.

Specifically in this process, the method comprises contacting a halo-substituted phthalic anhydride of formula (1) with an organic diamine of formula (2)

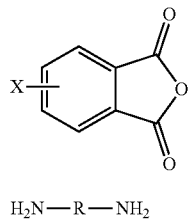
(1)

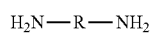
(2)

wherein X is fluoro, chloro, bromo, iodo, or a combination thereof. In some embodiments, X is chloro. In some embodiments, the halo-substituted phthalic anhydride comprises 3-chlorophthalic anhydride, 4-chlorophthalic anhydride or a combination comprising at least one of the foregoing.

The group R in formula (2) a substituted or unsubstituted divalent organic group, such as a $C_{6-20}$ aromatic hydrocarbon group, a straight or branched chain $C_{2-20}$ alkylene group, a $C_{3-8}$ cycloalkylene group, in particular a halogenated derivative of any of the foregoing. In some embodiments R is divalent group of one or more of the following formulas (3)

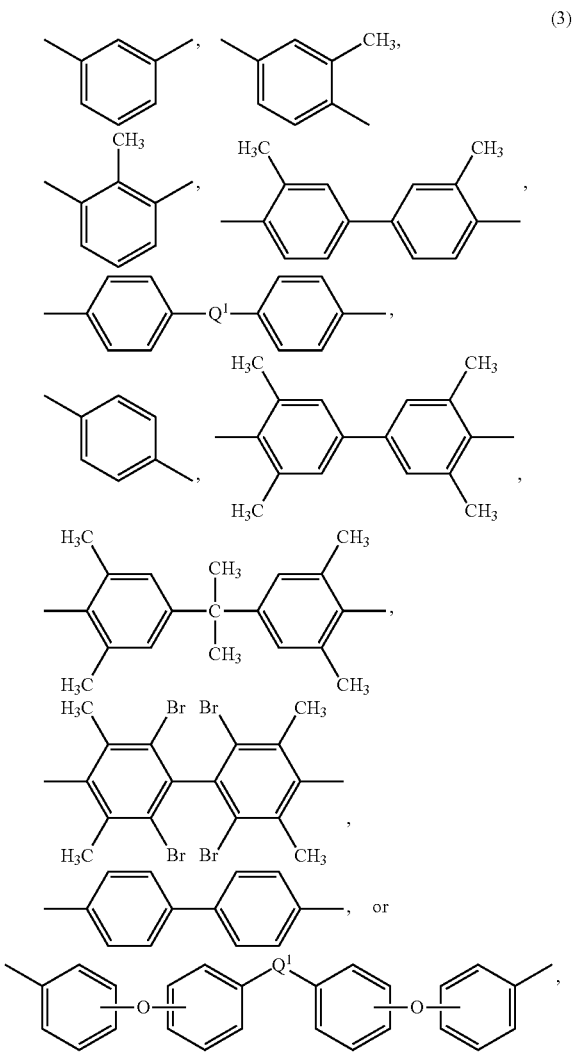
(3)

wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In another embodiment, at least 10 mol % of the R groups contain sulfone groups, for example 10 to 80 wt % or 50 to 80 wt %, of the R groups contain sulfone groups. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent or at least 50 mole percent of the R groups contain sulfone groups, and in other embodiments no R groups contain sulfone groups.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminoprooxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

Contacting the halo-substituted phthalic anhydride (1) with the organic diamine (2) provides a bis(halophthalimide) of formula (4)

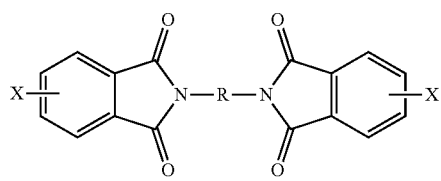

(4)

wherein X and R are as described in formulas (1) and (2). To provide the polyetherimide, the bis(halophthalimide) of formula (4) can be contacted with an alkali metal salt of a dihydroxy compound of formula (5)

$$M^+\text{—O—Z—O}^-{M}$$ (5)

wherein M is an alkali metal ion and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing. The alkali metal ion M can be, for example, lithium, sodium, potassium, or a combination comprising at least one of the foregoing. In some embodiments, M is sodium. Exemplary groups Z include groups derived from an aromatic dihydroxy compound of formula (6)

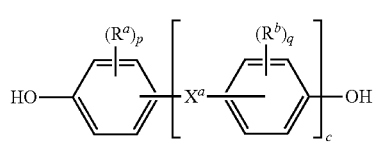

(6)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (6a)

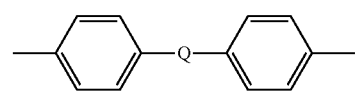

(6a)

wherein Q is —O—, —S—, —C(O)—, —SO$_2$—, —SO—, or —$C_yH_{2y}$— wherein y is an integer from 1 to 5 or a halogenated derivative thereof. Exemplary dihydroxy aromatic compounds from which Z can be derived include but are not limited to 2,2-bis(2-hydroxyphenyl)propane, 2,4'-dihydroxydiphenylmethane, bis(2-hydroxyphenyl)methane, 2,2-bis-(4-hydroxyphenyl)propane ("bisphenol A" or "BPA"), 1,1-bis-(4-hydroxyphenyl)ethane, 1,1-bis-(4-hydroxyphenyl)propane, 2,2-bis-(4-hydroxyphenyl)pentane, 3,3-bis-(4-hydroxyphenyl)pentane, 4,4'-dihydroxybiphenyl, 4,4'-dihydroxy-3,3,5,5'-tetramethylbiphenyl, 2,4'-dihydroxybenzophenone, 4,4'-dihydroxydiphenylsulfone, 2,4'-dihydroxydiphenylsulfone, 4,4'-dihydroxydiphenylsulfoxide, 4,4'-dihydroxydiphenylsulfide, hydroquinone, resorcinol, 3,4-dihydroxydiphenylmethane, 4,4'-dihydroxybenzophenone, 4,4'-dihydroxydiphenylether, and the like, or a combination comprising at least one of the foregoing. In some embodiments, Z is preferably 2,2-(4-phenylene)isopropylidene (i.e., the dihydroxy aromatic compound from which the dialkali metal salt is derived is 2,2-bis-(4-hydroxyphenyl)propane or bisphenol A, such that Q in formula (IIa) is 2,2-isopropylidene).

In a specific embodiment of the halo-displacement process, the reaction of two moles of a chlorophthalic anhydride, and one mole of meta-phenylene diamine provides a bis[N-(halophthalimido)]benzene (abbreviated "ClPAMI"). ClPAMI polymerizes with bisphenol A disodium salt (BPANa$_2$) in the presence of a phase transfer catalyst, such as hexaethyl guanidinium chloride (HEGCl). HEGCl is a well-known phase transfer catalyst to make polyetherimides, being described, for example in U.S. Pat. No. 5,229,482.

The polyetherimides comprises more than 1, for example 10 to 1000, or 10 to 500, or 10 to 100 structural units of formula (8)

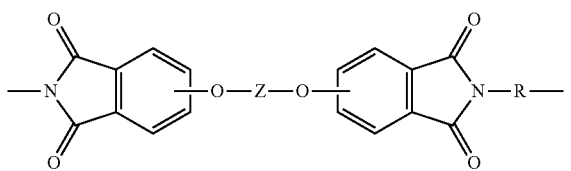

(8)

wherein each R and is the same or different, and is as described in formula (2), preferably m-phenylene or p-phenylene. Further in formula (8), the divalent bonds of the —O—Z—O— group are in the 3,3', 3,4', 4,3', or the 4,4' positions. Each group Z in formula (8) is the same or different and is as described in formula (5) above. In an embodiment in formula (8), R is m-phenylene or p-phenylene and Z is a divalent group of formula (6a). Alternatively, R is m-phenylene or p-phenylene and Z is a divalent group of formula (6a) and Q is 2,2-isopropylidene.

The polyetherimides can optionally further comprise additional imide units, for example, imide units of formula (9)

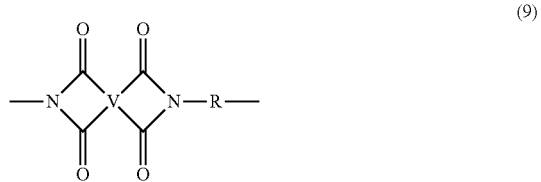

(9)

wherein R is as described in formula (2) and each V is the same or different, and is a substituted or unsubstituted $C_{6-20}$ aromatic hydrocarbon group, for example, a tetravalent linker of the formulas

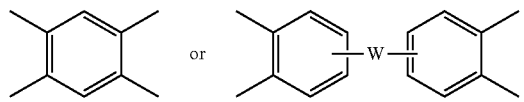

wherein W is a single bond, —S—, —C(O)—, —SO$_2$—, —SO—, or —C$_y$H$_{2y}$— wherein y is an integer from 1 to 5 or a halogenated derivative thereof (which includes perfluoroalkylene groups). These additional imide units can be present in amounts of 0 to 99 mol %, or 1 to 90 mol %, or 5 to 80 mol %, or 10 to 70 mol % of the total number of units. In some embodiments the additional imide units are present in amounts of 1 to 50 mole %, or 0 to 10 mol %, or 0 to 5 mol %, or 0 to 2 mol % of the total number of units. In some embodiments, no additional imide units are present in the polyetherimide.

In some embodiments the polyetherimide is preferably a polyetherimide comprising units derived from the reaction of bisphenol A dianhydride and m-phenylene diamine. The polyetherimide can be a polyetherimide homopolymer, a poly(etherimide-siloxane), a poly(etherimide sulfone), or a combination comprising at least one of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 Daltons (Da), as measured by gel permeation chromatography, using polystyrene standards. In some embodiments the polyetherimide has an Mw of 10,000 to 80,000 Da. Such polyetherimide polymers typically have an intrinsic viscosity greater than 0.2 deciliters per gram (dl/g), or, more specifically, 0.35 to 0.7 dl/g as measured in m-cresol at 25° C.

In some embodiments, the above-described methods further comprise isolating the polyetherimide from the solvent. In some embodiments, the isolating comprises precipitating the polyetherimide. In some embodiments, the isolating comprises evaporating the solvent, for example by extrusion or by thin film evaporation techniques. In some embodiments, the isolating can be by a combination comprising at least one of the foregoing isolation methods.

Another aspect of this disclosure is a polyetherimide having a reduced yellowness index. In some embodiments, the polyetherimide has a yellowness index that is less than or equal to 95, as determined according to ASTM D1925.

Another embodiment is a polyetherimide composition comprising the above-described polyetherimide. The polyetherimide can be melt-mixed with other polymers, fillers, and/or additives ordinarily incorporated into polymer compositions of this type to form compositions having one or more desired properties with the proviso that the polymers, fillers, and/or additives are selected so as to not significantly adversely affect the desired properties of the polyetherimide composition. In some embodiments, the polyetherimide composition can further include at least one additional polymer. Examples of such additional polymers include and are not limited to PPSU (polyphenylene sulfone), polyetherimides, polycarbonates, polyester-carbonates, polyesters, PSU (polysulfone), PPE (polyphenylene ether), PFA (perfluoroalkoxy alkane), MFA (co-polymer of TFE tetrafluoroethylene and PFVE (perfluorinated vinyl ether)), FEP (fluorinated ethylene propylene polymers), PPS (poly(phenylene sulfide), PTFE (polytetrafluoroethylene), PA (polyamide), PBI (polybenzimidizole), PAI (poly(amide-imide)), poly(ether sulfone), poly(aryl sulfone), polyphenylene, polybenzoxazoles, polybenzthiazoles, as well as blends and co-polymers thereof. When present, the at least one additional polymer is used in an amount from more than 0 to 20 wt. %, specifically 0.1 to 15 wt. %, and more specifically from 0.5 to 10 wt. %, all based on the total weight of the polyetherimide composition. In some embodiments, no polymer other than the polyetherimide as described herein is present in the polyetherimide composition.

In addition to the polyetherimide and any optional thermoplastic polymers different from the polyetherimide, the composition can further include an additive composition, comprising one or more additives selected to achieve a desired property, with the proviso that the one or more additives are also selected so as to not significantly adversely affect a desired property of the composition. The additive composition or individual additives can be mixed at a suitable time during the mixing of the components for forming the composition. The additive can be soluble and/or non-soluble in polyetherimide. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising at least one of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.005 to 20 wt. %, or 0.01 to 10 wt. %, each based on the total weight of the polymer in the composition.

The polyetherimide composition can be prepared by blending the ingredients under conditions for the formation of an intimate blend. Such conditions often include melt mixing in single or twin screw-type extruders, mixing bowl, or similar mixing devices that can apply a shear to the components. Co-rotating twin-screw extruders are often preferred due to their self-cleaning capability and to have better control over flowrate, residence time, and mixing, over single screw extruders. It is often advantageous to apply a vacuum to the blend through at least one vent port in the extruder to remove volatile impurities in the composition. Often it is advantageous to dry the polyetherimide composition prior to melt mixing. The melt mixing is often done at 290 to 340° C. to avoid excessive polymer degradation while still allowing sufficient melting to get an intimate polymer mixture free of any unbelted components. The polymer blend can also be melt filtered using a 40 to 100 micrometer candle or screen filter to remove undesirable black specks or other heterogeneous contaminants.

The polyetherimides disclosed herein are well suited for a variety of uses, including the manufacture of various articles. Thus, another aspect of this disclosure is an article comprising the polyetherimide described herein, for example an article comprising a polyetherimide having a yellowness index that is less than or equal to 95, as determined according to ASTM D1925. For example, and without limitation, the polyetherimides can be used for medical uses, food service uses, housewares, electronics, packaging, computer enclosures, trays, drinking glasses, pitchers, syringes, connectors, filter housings, pipes, cell phone housings, keycaps, handles, bottles, films, coatings, rat cages for research and development, and the like. The polyetherimide composition can be formed into an article by any number of methods including shaping, extruding (including profile extrusion), thermoforming, and molding, including injection molding, compression molding, gas assist molding, structural foam molding, and blow molding. In some embodiments, a method of forming an article comprises shaping, extruding, blow molding, or injection molding the composition to form the article. The polyetherimide compositions can also be formed into articles using thermoplastic processes such as film extrusion, sheet extrusion, melt casting, blown film extrusion, and calendaring. Co-extrusion and lamination processes can be used to form composite multilayer films or sheets. The article is selected from a sheet, film, multilayer sheet, multilayer film, molded part, extruded profile, coated part, pellets, powder, foam, fiber, fibrids, flaked fibers, and combinations thereof. In some instances articles can be formed by melt processing such as injection molding, extrusion or blow molding.

Provided herein are new methods for reducing the yellowness of a polyetherimide. The resulting polyetherimides having reduced color are particularly useful for the preparation of various compositions and articles in applications where low color is desirable.

The methods, compositions, and articles are further illustrated by the following non-limiting examples.

EXAMPLES

The materials used for the following Examples are provided in Table 1.

TABLE 1

| Description of Materials | | |
|---|---|---|
| Component | Description | Supplier |
| PEI-1 | Quenched polyetherimide made from the reaction of chlorophthalic anhydride, meta-phenylene diamine and bisphenol A, having a glass transition temperature of 217° C., as a solution in ortho-dichlorobenzene at 10 wt. % solids. | SABIC |
| PEI-2 | Quenched polyetherimide made from the reaction of chlorophthalic anhydride, meta-phenylene diamine and bisphenol A, having a glass transition temperature of 217° C., as a solution in ortho-dichlorobenzene at 30% solids. | SABIC |
| PEI-3 | Unquenched polyetherimide made from the reaction of chlorophthalic anhydride, meta-phenylene diamine and bisphenol A, having a glass transition temperature of 217° C., as a solution in ortho-dichlorobenzene at 30% solids, with sodium chloride at 6% concentration. | SABIC |
| $H_3PO_4$ | Phosphoric acid, anhydrous | Merck |
| $K_3PO_4$ | Potassium phosphate, tribasic | Sigma-Aldrich |
| DEA | Diethanolamine | Sigma-Aldrich |
| Benzoic acid | Benzoic acid | Sigma-Aldrich |
| Oxalic acid | Oxalic acid | Sigma-Aldrich |
| ODCB | o-dichlorobenzene | Sigma-Aldrich |

Yellowness index (YI) of polyetherimide solutions was measured according to ASTM D1925. Hunter L, a, and B parameters were measured in accordance with ASTM D1925. All ASTM tests are based on the 2010 edition of the Annual Book of ASTM Standards unless otherwise indicated.

Example 1

Solutions having a concentration of 10 wt. % solution of PEI-1 in o-dichlorobenzene (oDCB) were prepared. Anhydrous phosphoric acid was added to the solutions in proportions of 2-5% w/w vs. polymer, and a decrease in the yellowness index of the samples was noted. The initial YI of the PEI-1 solution was 116. Following treatment with anhydrous phosphoric acid, the solution was filtered through a 0.2 micron PTFE lab filter, and the YI was determined. The YI value decreased to 107.

Further studies indicated that the concentration of the phosphoric acid can affect the change in YI. For a PEI-1 sample having an initial YI of 105, the YI could be reduced to 99 upon addition of 2% weight percent anhydrous phosphoric acid, based on the weight of the polyetherimide, and the YI could be reduced to 101 upon addition 5% weight percent anhydrous phosphoric acid, based on the weight of the polyetherimide.

Example 2

Experiments were also performed to determine the effect of solution pH on yellowness.

A 10 weight percent polymer solution in ortho-dichlorobenzene was prepared from PEI-2 in oDCB, and was protected from light. The color of the initial solution was evaluated, and found to have a YI of 115, an L value of 80.9, an a value of 11.5, and a b value of 77.6 (shown as Example 2a in Table 2 below). The solution was then treated with anhydrous phosphoric acid, potassium phosphate, diethanolamine, oxalic acid, or benzoic acid, and the color of the solution again evaluated. The results are summarized in Table 2 below. The amount of each component added to the example solutions to adjust the pH is shown in grams. Following addition of the components, each example solution was protected from light. Each solution was allowed to age for one day, and the color properties were tested again.

TABLE 2

Effect of solution pH on YI

| Component Added | Example 2a | Example 2b | Example 2c | Example 2d | Example 2e | Example 2f |
|---|---|---|---|---|---|---|
| PEI-1 Solution (g.) | 70 | 70 | 70 | 70 | 70 | 70 |
| $H_3PO_4$ (g.) | | 0.47 | | | | |
| $K_3PO_4$ (g.) | | | 0.43 | | | |
| DEA (g.) | | | | 0.8 | | |
| Oxalic Acid (g.) | | | | | 0.1 | |
| Benzoic Acid (g.) | | | | | | 0.1 |
| Color Properties | | | | | | |
| YI | 115 | 108 | 134 | 150 | 100 | 106 |
| YI, 1 day | 117 | 109 | 141 | 155 | — | — |
| L | 80.9 | 79.8 | 76.8 | 61.9 | — | — |
| L, 1 day | 77.9 | 80.0 | 74.6 | 56.9 | — | — |
| A | 11.5 | 6.2 | 20.5 | 27.0 | — | — |
| a, 1 day | 12.0 | 6.3 | 24.6 | 28.1 | — | — |
| B | 77.6 | 73.0 | 91.2 | 87.7 | — | — |
| b, 1 day | 76.5 | 74.5 | 95.2 | — | — | — |

Example 2b shows that the addition of 0.47 grams of phosphoric acid to the solution of Example 2a reduced the yellowness index from 115 to 108. Addition of a basic compound such as potassium phosphate (Example 2c) or diethanolamine (Example 2d), had the opposite effect, and the YI value was observed to increase to 134 and 150, respectively. Examples 2e and 2f show that the addition of 0.1 grams of an organic acid (e.g., oxalic acid or benzoic acid) can lower the yellowness index of the solution. This suggests that the molecule responsible for the color of the solutions behaves similar to a pH indicator, changing color with the pH of the solution media.

This effect was observed to be fully reversible. Addition of 1.5 grams of anhydrous phosphoric acid to the solution of Example 2c to render the solution acidic resulted in a decrease in the YI value to 115. The L, a, and b values were also observed to decrease in response to the addition of the acid, to 65.6, 9.5, and 65.7, respectively. Similarly, addition of 3.3 grams of phosphoric acid to the solution of Example 2d to render the solution acidic also resulted in a decreases in the YI value to 124, with L, a, and b values also decreased to 59.3, 11.6, and 69.0, respectively.

Example 3

Additional experiments were performed to determine the effect of changing pH in combination with exposing the solution to light on the solution yellowness.

A 10 weight percent polymer solution was prepared from PEI-2 in ortho-dichlorobenzene, as in Example 2, and the solution was protected from light. The color of the initial solution was evaluated, and found to have a YI of 113, an L value of 81.6, an a value of 10.6, and a b value of 76.6. The solution was then exposed to sunlight for four hours, and the color properties were evaluated again (YI=93, shown as Example 3a in Table 3 below). Following the light exposure, the solution was treated with anhydrous phosphoric acid (acid) and potassium phosphate (base), and the color of the solution again evaluated. The results are summarized in Table 3 below. The amount of each component added to the solutions of Examples 3b-3c to adjust the pH is shown in grams.

TABLE 3

Effect of pH change combined with light exposure on YI*

| Component Added | Example 3a | Example 3b | Example 3c |
|---|---|---|---|
| PEI-2 Solution (g.) | 70 | 70 | 70 |
| $H_3PO_4$ (g.) | | 0.47 | |
| $K_3PO_4$ (g.) | | | 0.43 |
| YI | 93 | 95 | 93 |
| L | 86.1 | 84. | 85.4 |
| a | 3.1 | 3.0 | 3.2 |
| b | 63.0 | 63.9 | 62.6 |

*Starting material YI = 113, a = 10.6 b = 76.6, L = 81.6

The results shown in Table 3 indicate that the YI of a PEI solution can be lowered by exposing the solution to light. As illustrated by Examples 3b-3c, changing the solution pH by addition of either an acid (phosphoric acid) or a base (potassium phosphate), had very little or no further effect on the color properties of the solution.

Example 4

An additional set of experiments were carried out to further assess the combination of light and pH to reduce the yellowness of a polyetherimide solution. An initial solution was prepared having a solids content of 10% using the unquenched PEI-3 in ortho-dichlorobenzene. The color properties of this solution indicated a YI of 167 (Example 4a). This solution was separated into two. The first was treated with anhydrous phosphoric acid in the absence of light (Example 4b), and the second was exposed to sunlight for 4 hours (Example 4c). Table 4 summarizes the results obtained from these samples.

TABLE 4

Effect of light and pH on the YI of unquenched polymer solution

|   | Example 4a | Example 4b | Example 4c |
|---|---|---|---|
| YI | 167 | 110 | 94 |
| L | 62.5 | 82.2 | 81.2 |
| a | 37.9 | 10.9 | 5.2 |
| b | 99.0 | 73.0 | 58.6 |

As shown in Table 4, addition of phosphoric acid decreased the YI value from 167 to 110. However, exposure of the solution to sunlight for 4 hours as in Example 4c decreased the YI value even further, from 167 to 94.

The solution of Example 4b was further split into two, shown below as Examples 4d and 4e. The first was kept protected from light (Example 4d). The second was exposed to sunlight for four hours (Example 4e). The results are summarized in Table 5.

TABLE 5

Decoupled effect of acid and sunlight on YI of unquenched polymer solution

|   | Example 4b | Example 4d | Example 4e |
|---|---|---|---|
| YI | 110 | 110 | 94 |
| L | 82.2 | 81.7 | 87.4 |
| a | 10.9 | 10.7 | 3.5 |
| b | 73.0 | 72.6 | 64.2 |

As shown in Table 5, exposure of the acid-treated solution to sunlight further decreased the YI value to 94. This YI value corresponds to the YI value obtained for Example 4c, where the solution was exposed to light but not treated with acid. The solution of Example 4d (not exposed to sunlight) retained the reversibility previously noted. Upon addition of potassium phosphate, the yellowness index was increased to 151.

The solution of Example 4c was also treated with phosphoric acid, which gave a YI value of 99.

Upon addition of potassium phosphate to the solutions of Examples 4c and 4e, the YI values remained largely unchanged, in contrast to Example 4d, discussed above. The YI value for Examples 4c and 4e after addition of potassium phosphate was about 94-96. These results indicate that the same final yellowness index value can be obtained regardless of if the sample if exposed to light before or after a treatment to adjust the pH of the solution, for example with phosphoric acid.

The various aspects are further illustrated by the following embodiments, which are non-limiting.

Embodiment 1

A method of reducing yellowness of a polyetherimide solution, the method comprising exposing a first solution comprising a solvent and a polyetherimide to light under conditions effective to provide a second solution having a yellowness index that is 1 to 100, preferably 10 to 90, more preferably 20 to 80, even more preferably 40 to 75 units less than the yellowness index of the first solution, as determined according to ASTM D1925.

Embodiment 2

The method of embodiment 1, wherein the light is sunlight.

Embodiment 3

A method of reducing yellowness of a polyetherimide solution, the method comprising acidifying a first solution comprising a solvent and a polyetherimide to provide a second solution having a pH less than 5, preferably less than 3, more preferably less than 2.5 under conditions effective for the second solution to attain a yellowness index that is 1 to 30, preferably 2 to 25, more preferably 5 to 20 units less than the yellowness index of the first solution, as determined according to ASTM D1925.

Embodiments 4

The method of embodiment 3, wherein the acidifying comprises combining the first solution with one or both of an inorganic acid, preferably phosphoric acid, sulfuric acid, hydrochloric acid, or a combination comprising at least one of the foregoing; an organic acid, preferably oxalic acid, benzoic acid, or a combination comprising at least one of the foregoing.

Embodiment 5

The method of embodiment 3 or embodiment 4, further comprising exposing the second solution to light for a predetermined amount of time to provide a third solution, wherein the third solution has a yellowness index that is 1 to 100, preferably 10 to 90, more preferably 20 to 80, even more preferably 40 to 75 units less than the yellowness index of the first solution, as determined according to ASTM D1925.

Embodiment 6

The method of embodiment 3 or embodiment 4, further comprising adding a base to the second solution to increase the pH to 6 to 12, preferably 7 to 9, to provide a fourth solution, wherein the fourth solution has a yellowness index that is 110 to 170, preferably 130 to 170, as determined according to ASTM D1925.

Embodiment 7

The method of embodiment 5, wherein the third solution has a yellowness index that is 1 to 30, preferably 5 to 25, more preferably 10 to 20 units less than the yellowness index of the second solution, as determined according to ASTM D1925.

Embodiment 8

The method of any one or more of embodiments 1 to 7, wherein the conditions include a temperature of 10 to 200° C., preferably 15 to 35° C., more preferably 20 to 25° C.; and a time of 1 minute to 72 hours, preferably 10 minutes to 120 minutes.

Embodiment 9

The method of any one or more of embodiments 1 to 8, wherein the solvent comprises benzene, ortho-dichlorobenzene, or a combination comprising at least one of the foregoing.

Embodiment 10

The method of any one or more of embodiments 1 to 9, wherein the polyetherimide comprises units of the formula

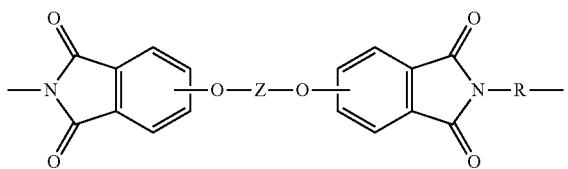

wherein R is a $C_{2-20}$ hydrocarbon group, T is a group of the formula —O—Z—O— wherein the divalent bonds of the —O—Z—O— group are in the 3,3', 3,4', 4,3', or the 4,4' positions, and Z is an aromatic $C_{6-24}$ monocyclic or polycyclic group optionally substituted with 1 to 6 $C_{1-8}$ alkyl groups, 1-8 halogen atoms, or a combination comprising at least one of the foregoing.

Embodiment 11

The method of embodiment 10, wherein R is a divalent group of the formula

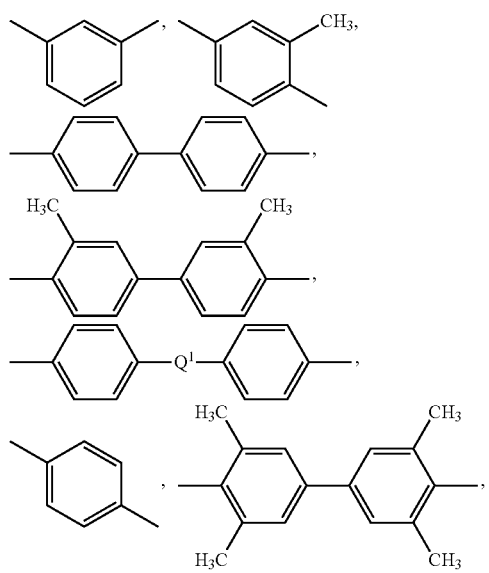

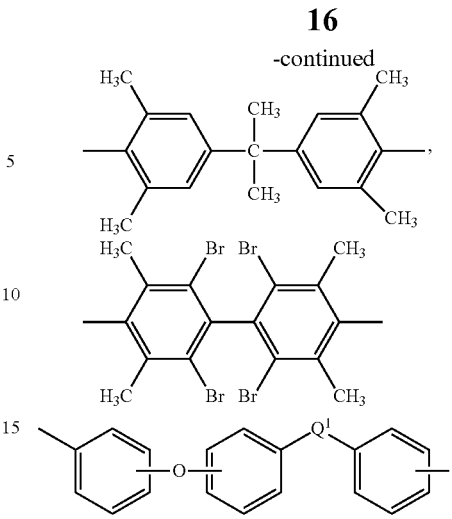

wherein $Q^1$ is —O—, —S—, —C(O)—, —SO$_2$—, —SO—, —$C_yH_{2y}$— and a halogenated derivative thereof wherein y is an integer from 1 to 5, or —$(C_6H_{10})_z$— wherein z is an integer from 1 to 4; and Z is a group derived from a dihydroxy compound of the formula

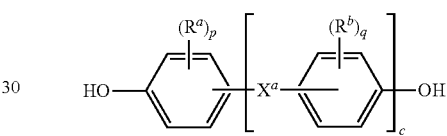

wherein $R^a$ and $R^b$ are each independently a halogen atom or a monovalent $C_{1-6}$ alkyl group; p and q are each independently integers of 0 to 4; c is 0 to 4; and $X^a$ is a single bond, —O—, —S—, —S(O)—, —SO$_2$—, —C(O)—, or a $C_{1-18}$ organic bridging group.

Embodiment 12

The method of embodiment 10 or 11, wherein each R is independently meta-phenylene, para-phenylene, 4,4'-diphenylsulfone, or a combination comprising at least one of the foregoing, and the Z is 4-4'-diphenylene isopropylidene.

Embodiment 13

The method of any of embodiments 10 to 12, wherein at least 10 mole percent of the R groups comprise a sulfone group, preferably wherein R is 4,4'-diphenylsulfone and Z is 4,4'-diphenylene isopropylidene.

Embodiment 14

The method of any one or more of embodiments 1 to 13, further comprising isolating the polyetherimide from the solvent

Embodiment 15

The method of embodiment 14, wherein the isolating comprises precipitating the polyetherimide, evaporating the solvent, or a combination comprising at least one of the foregoing.

Embodiment 16

A polyetherimide having a reduced yellowness index made from the method of any one or more of embodiments 1 to 15.

Embodiment 17

The polyetherimide of embodiment 16, wherein the polyetherimide has a yellowness index of less than 95, as determined according to ASTM D1925.

Embodiment 18

A composition comprising the polyetherimide of embodiment 16 or claim 17.

Embodiment 19

An article comprising the polyetherimide of embodiment 16 or 17. In general, the methods, compositions, and articles can alternatively comprise, consist of, or consist essentially of, any appropriate components herein disclosed. The methods, compositions, and articles can additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." It is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, 0, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula $-C_nH_{2n-x}$ and $-C_nH_{2n-2x}-$ wherein x is the number of cyclization(s). "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

Substituted" means that the compound or group is substituted with at least one (e.g., 1, 2, 3, or 4) substituents instead of hydrogen, where each substituent is independently nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s). All references are incorporated herein by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of reducing yellowness of a polyetherimide solution, the method comprising
    acidifying a first solution comprising a solvent and a polyetherimide to provide a second solution having a pH less than 5 under conditions effective for the second solution to attain a yellowness index that is 1 to 30 units less than the yellowness index of the first solution, as determined according to ASTM D1925.

2. The method of claim 1, wherein the acidifying comprises combining the first solution with one or both of
    an inorganic acid;
    an organic acid.

3. The method of claim 1, further comprising exposing the second solution to light for a predetermined amount of time to provide a third solution, wherein the third solution has a yellowness index that is 1 to 100 units less than the yellowness index of the first solution, as determined according to ASTM D1925.

4. The method of claim 1, further comprising adding a base to the second solution to increase the pH to 6 to 12 to provide a fourth solution, wherein the fourth solution has a yellowness index that is 110 to 170 as determined according to ASTM D1925.

5. The method of claim 3, wherein the third solution has a yellowness index that is 1 to 30 units less than the yellowness index of the second solution, as determined according to ASTM D1925.

6. The method of claim 1, wherein the conditions include
    a temperature of 10 to 200° C.; and
    a time of 1 minute to 72 hours.

7. The method of claim 1, wherein the solvent comprises benzene, ortho-dichlorobenzene, or a combination comprising at least one of the foregoing.

8. The method of claim 1, wherein the polyetherimide comprises units of the formula

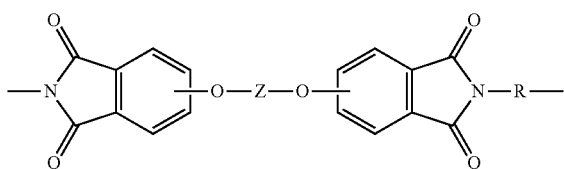

wherein
R is a $C_{2-20}$ hydrocarbon group,
T is a group of the formula —O—Z—O— wherein the divalent bonds of the —O—Z—O— group are in the 3,3', 3,4', 4,3', or the 4,4' positions, and
is an aromatic $C_{6-24}$ monocyclic or polycyclic group optionally substituted with 1 to 6 $C_{1-8}$ alkyl groups, 1-8 halogen atoms, or a combination comprising at least one of the foregoing.

9. The method of claim 8, wherein R is a divalent group of the formula

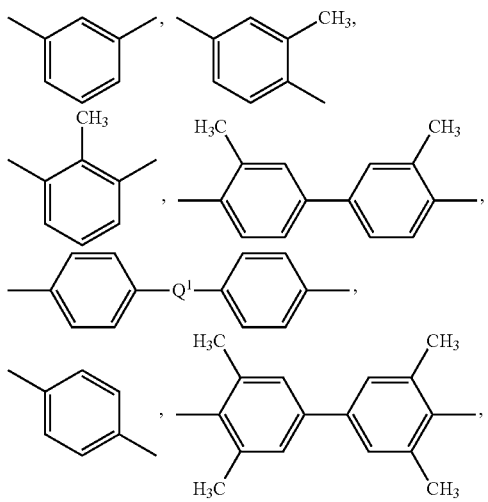

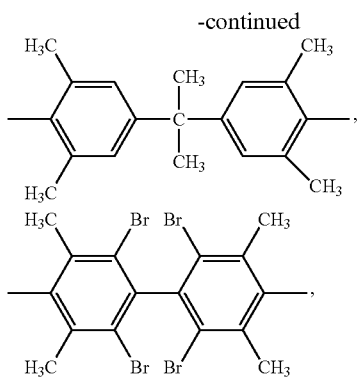

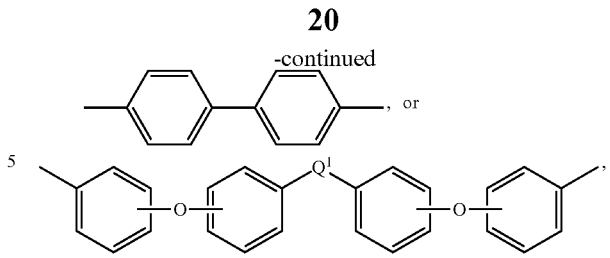

wherein $Q^1$ is —O—, —S—, —C(O)—, —SO$_2$—, —SO—, —C$_y$H$_{2y}$— and a halogenated derivative thereof wherein y is an integer from 1 to 5, or —(C$_6$H$_{10}$)$_z$— wherein z is an integer from 1 to 4; and Z is a group derived from a dihydroxy compound of the formula

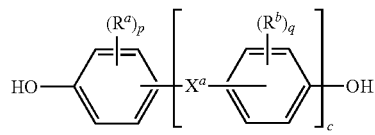

wherein
$R^a$ and $R^b$ are each independently a halogen atom or a monovalent $C_{1-6}$ alkyl group;
p and q are each independently integers of 0 to 4;
c is 0 to 4; and
$X^a$ is a single bond, —O—, —S—, —S(O)—, —SO$_2$—, —C(O)—, or a $C_{1-18}$ organic bridging group.

10. The method of claim 8, wherein each R is independently meta-phenylene, para-phenylene, bis(4,4'-phenylene) sulfone, or a combination comprising at least one of the foregoing, and the Z is 4-4'-diphenylene isopropylidene.

11. The method of claim 8, wherein at least 10 mole percent of the R groups comprise a sulfone group and Z is 4,4'-diphenylene isopropylidene.

12. The method of claim 1, wherein the polyetherimide is a copolymer further comprising units of the formula

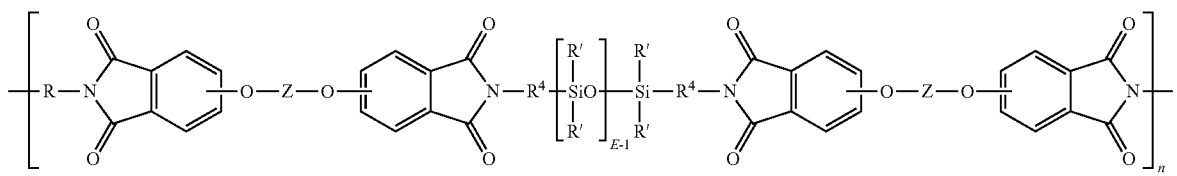

wherein each R' is independently a $C_{1-13}$ monovalent hydrocarbyl group, each $R^4$ is a $C_2$-$C_{20}$ hydrocarbyl group, E of the siloxane is 2 to 50, the R and Z of the imide are as in claim 9, and n is an integer from 5 to 100.

13. The method of claim 1, further comprising isolating the polyetherimide from the solvent.

14. The method of claim 13, wherein the isolating comprises precipitating the polyetherimide, evaporating the solvent, or a combination comprising at least one of the foregoing.

15. A polyetherimide having a reduced yellowness index made from the method of claim 1.

16. The polyetherimide of claim 15, wherein the polyetherimide has a yellowness index of less than 95, as determined according to ASTM D1925.

17. A composition comprising the polyetherimide of claim 15.

18. An article comprising the polyetherimide of claim 15.

* * * * *